(12) United States Patent
Sakamoto et al.

(10) Patent No.: US 11,531,010 B2
(45) Date of Patent: Dec. 20, 2022

(54) ION SUPPRESSOR AND ION CHROMATOGRAPH

(71) Applicant: Shimadzu Corporation, Kyoto (JP)

(72) Inventors: Katsumasa Sakamoto, Kyoto (JP); Masanori Fujiwara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 429 days.

(21) Appl. No.: 16/624,436

(22) PCT Filed: Jul. 24, 2017

(86) PCT No.: PCT/JP2017/026735
§ 371 (c)(1),
(2) Date: Dec. 19, 2019

(87) PCT Pub. No.: WO2019/021352
PCT Pub. Date: Jan. 31, 2019

(65) Prior Publication Data
US 2020/0132639 A1  Apr. 30, 2020

(51) Int. Cl.
| | | |
|---|---|---|
| *B01D 15/24* | (2006.01) | |
| *B01D 15/36* | (2006.01) | |
| *B01D 61/46* | (2006.01) | |
| *B01D 65/02* | (2006.01) | |
| *G01N 30/64* | (2006.01) | |

(52) U.S. Cl.
CPC .............. *G01N 30/64* (2013.01); *B01D 15/24* (2013.01); *B01D 15/361* (2013.01); *B01D 61/46* (2013.01); *B01D 65/02* (2013.01); *B01D 2321/16* (2013.01); *G01N 2030/645* (2013.01)

(58) Field of Classification Search
CPC .. G01N 30/64; G01N 2030/645; B01D 15/24; B01D 15/361; B01D 61/46; B01D 65/02; B01D 2321/16
See application file for complete search history.

(56) References Cited

U.S. PATENT DOCUMENTS

| | | | | |
|---|---|---|---|---|
| 4,999,098 A | * | 3/1991 | Pohl ...................... | G01N 30/84 204/522 |
| 5,045,204 A | * | 9/1991 | Dasgupta ........... | B01D 19/0031 210/635 |
| 2008/0047330 A1 | * | 2/2008 | Whitehouse .......... | H01J 49/165 73/61.53 |

FOREIGN PATENT DOCUMENTS

| | | |
|---|---|---|
| WO | 00/42426 A1 | 7/2000 |
| WO | 2011/132518 A1 | 10/2011 |
| WO | 2016/098260 A1 | 6/2016 |

OTHER PUBLICATIONS

Machine Translation of WO 2016/098260.*
(Continued)

*Primary Examiner* — Benjamin L Lebron
(74) *Attorney, Agent, or Firm* — Maier & Maier, PLLC

(57) ABSTRACT

An ion suppressor includes ion exchange membranes between a pair of electrodes. Regeneration liquid channels are provided in the spaces between the electrodes and the ion exchange membranes, and an eluent channel is provided between the ion exchange membranes. In the space between the electrode and the eluent channel, an element that increases the resistance in the voltage application direction is disposed. For example, ion permeable membranes are disposed in contact with the ion exchange membrane, thereby increasing the resistance in the voltage application direction.

16 Claims, 8 Drawing Sheets

(56) References Cited

OTHER PUBLICATIONS

Chinese Office Action dated Oct. 11, 2021 in corresponding Chinese Application No. 201780090888.4; 13 pages with English machine translation.
International Search Report with English translation and Written Opinion with Machine translation dated Oct. 10, 2017 in corresponding International Application No. PCT/JP2017/026735; 13 pages.

* cited by examiner

ION SUPPRESSOR AND ION CHROMATOGRAPH

FIELD

The present disclosure relates to an ion suppressor and an ion chromatograph.

BACKGROUND

In ion chromatography, ions in a sample are detected and quantified by introducing the sample into a separation column to separate the ions, and then guiding an eluent from the separation column to an electric conductivity meter to measure the electric conductivity. In suppressor-type ion chromatograph, with a suppressor disposed between a separation column and an electric conductivity meter, the electric conductivity of an eluent is decreased by electrodialysis to allow high-sensitivity measurements.

FIG. 10 is an exploded perspective view illustrating a configuration example of an ion suppressor. The ion suppressor 201 includes two ion exchange membranes 241 and 243 between an anode 221 and a cathode 223. Regeneration liquid channel supports 231 and 233 are disposed respectively between the anode 221 and the ion exchange membrane 241 on the anode side and between the cathode 213 and the ion exchange membrane 243 on the cathode side. An eluent channel support 260 is disposed between the two ion exchange membranes 241 and 243. Openings 231a and 233a are provided in the surfaces of the regeneration liquid channel supports 231 and 233, respectively. The eluent channel support 260 is provided with an opening 260a. The openings 231a, 233a, and 260a provided in these supports are hollow, or made of a mesh material to allow passage of liquid.

The anode 221, the cathode 223, the regeneration liquid channel supports 231 and 233, the ion exchange membranes 241 and 243, and the eluent channel support 260 are each provided with through holes for passing bolts 291 and 292 therethrough. These constituent members are sandwiched from above and below by holders 211 and 213 and fixed by the bolts 291 and 292, thereby assembling the ion suppressor 201 shown in the cross-sectional view of FIG. 11.

The anode 221 is provided with regeneration liquid passage holes 221c at two sites, and the cathode 223 is provided with regeneration liquid passage holes 223c at two sites. The regeneration liquid introduced from a regeneration liquid introduction hole 211c1 of the holder 211 passes through one regeneration liquid passage hole 221c1, and the regeneration liquid is then guided to the opening 231a of the regeneration liquid channel support 231. The opening 231a provided in the regeneration liquid channel support 231 disposed between the anode 221 and the ion exchange membrane 241 constitutes a regeneration liquid channel 271. The regeneration liquid guided to the channel 271 passes through the other regeneration liquid passage hole 221c2, and the regeneration liquid is then discharged from a regeneration liquid discharge hole 211c2 of the holder 211. Likewise, the regeneration liquid introduced from a regeneration liquid introduction hole 213c1 of the holder 213 passes through one regeneration liquid passage hole 223c1, and is then guided to a regeneration liquid channel 273, and the regeneration liquid passes through the other regeneration liquid passage hole 223c2, and is then discharged from a regeneration liquid discharge hole 213c2.

The cathode 223, the regeneration liquid channel support 233 and the ion exchange membrane 243 are provided respectively with eluent passage holes 223e, 233e, and 243e. The anode 221, the regeneration liquid channel support 231, and the ion exchange membrane 241 are provided respectively with eluent passage holes 221f, 231f, and 241f. The eluent from the separation column is introduced from an eluent introduction hole 213e of the holder 213 into the ion suppressor 201, passes through the eluent passage holes 223e, 233e, and 243e, and is guided to the opening 260a provided in the eluent channel support 260. The opening 260a provided in the eluent channel support 260 disposed between the two ion exchange membranes 241 and 243 constitutes an eluent channel 276. The eluent passing through the eluent passage hole 243e and guided to one end of the eluent channel 276 moves to the other end of the eluent channel 276, and then passes through the eluent passage holes 241f, 231f, and 221f, and the eluent is then discharged from the eluent discharge hole 211f of the holder 211, and guided to a detector (electric conductivity meter).

In the case of measuring anions by suppressor-type ion chromatography, cation exchange membranes are used as the ion exchange membranes 241 and 233. When a voltage is applied between the anode 221 and the cathode 223, $H^+$ is supplied from the ion exchange membrane 241 on the anode side to the eluent channel 276, and cations such as sodium ions and potassium ions in the eluent are exchanged for $H^+$. The cations in the eluent exchanged for $H^+$ move to the ion exchange membrane 243 on the cathode side. For example, in a case where a carbonate buffer is used as the eluent, cations (sodium ions, potassium ions, etc.) in the eluent are exchanged for hydrogen ions in the eluent channel 76, thereby converting carbonate ions in the eluent to a carbonic acid and converting hydroxide ions to water, and thus decreasing the electric conductivity. The ion suppressor 201 decreases the electric conductivity of the eluent, decreasing the background during the measurement with the electric conductivity meter. In addition, the counter ion of the anion to be measured is also exchanged for H'. Since the electric conductivity of $H^+$ is about 7 times as high as the electric conductivity of sodium ion, the counter ion is exchanged for H', thereby resulting in high-sensitivity detection of the anion to be measured.

In the electric regeneration-type ion suppressor, water or an eluent discharged from the detector is introduced as the regeneration liquid into the regeneration liquid channels 271 and 273. In the regeneration liquid channel 271 between the anode 221 and the ion exchange membrane 241, H' and $O_2$ are produced by electrolysis of water. In the regeneration liquid channel 273 between the cathode 223 and the ion exchange membrane 243, $OH^-$ and $H_2$ are produced by electrolysis of water. The $H^+$ produced in the regeneration liquid channel 271 on the anode side moves to the ion exchange membrane 241. The cation moving from the eluent channel 276 to the ion exchange membrane 243 moves to the regeneration liquid channel 273 on the cathode side, and serves as a counter ion of $OH^-$. In this way, the regeneration liquid is allowed to flow through the regeneration liquid channels 271 and 273 separated by the eluent channel 276 and the ion exchange membranes 241 and 233, thereby maintaining the balance of ions entering and exiting the ion exchange membrane, and thus electrochemically regenerating ion-exchange functional groups.

Patent Document 1 proposes that, in the eluent channel 276 of the ion suppressor 201, the resistance on the upstream side (the side close to the eluent introduction hole 213e) is relatively made lower than that on the downstream side (the side close to the eluent discharge hole 211f. The eluent on the upstream side of the eluent channel has a large ion amount to be exchanged, whereas the ion exchange is almost completed on the downstream side of the eluent channel, with a small ion amount to be exchanged. Accordingly, the upstream side is made relatively low in resistance to increase the amount of current, thereby improving current efficiency.

PRIOR ART DOCUMENTS

Patent Documents

Patent Document 1: WO 00/42426

SUMMARY

As described in Patent Document 1, when the amount of current on the upstream side of the eluent channel is relatively increased, the current efficiency is improved, but noise is likely to be generated on the baseline in the measurement of electric conductivity with detector. In addition, the ion exchange membranes are likely to be degraded, and the life of the ion suppressor tends to be shortened. In view of these problems, an object of the present invention is to provide a low-noise and long-life ion suppressor.

Means for Solving the Problems

The inventors have found that the local generation of gases (hydrogen and oxygen) in the regeneration liquid channel contributes to the noise and the degradation of the ion exchange membrane, and that a resistance increase element that increases the resistance in the voltage application direction is disposed, thereby allowing the local generation gases to be suppressed.

The ion suppressor according to the present invention includes a first ion exchange membrane and a second ion exchange membrane between a pair of electrodes of a first electrode and a second electrode. An eluent channel for allowing passage of an eluent from a separation column of an ion chromatograph is provided in the space between the first ion exchange membrane and the second ion exchange membrane. A first regeneration liquid channel for allowing passage of a regeneration liquid that regenerates the first ion exchange membrane is provided in the space between the first electrode and the first ion exchange membrane, and a second regeneration liquid channel for allowing passage of a regeneration liquid that regenerates the second ion exchange membrane is provided in the space between the second electrode and the second ion exchange membrane.

According to a first embodiment of the present invention, an ion permeable membrane as a resistance increase element is disposed in contact with the ion exchange membrane. The ion permeable membrane allows permeation of ions that permeate the ion exchange membrane. For example, in a case where the ion exchange membrane is a cation exchange membrane, the ion permeable membrane allows permeation of cations. The ion permeable membrane disposed in contact with the ion exchange membrane may be an ion exchange membrane. The ion permeable membrane may be disposed in contact with any surface of the ion exchange membrane.

The ion permeable membrane disposed in contact with the ion exchange membrane is preferably higher in resistivity than the ion exchange membrane. The ion permeable membrane disposed in contact with the ion exchange membrane is preferably lower in swelling ratio with respect to water than the ion exchange membrane. The ion permeable membrane disposed in contact with the ion exchange membrane may be smaller in area than the ion exchange membrane.

As the ion exchange membrane, a membrane made of a fluorine-based material is preferably used. Examples of the ion permeable membrane disposed in contact with the fluorine-based ion exchange membrane include a hydrocarbon-based ion exchange membrane.

According to a second embodiment of the present invention, the resistance increase element is disposed in a region of the regeneration channel facing the eluent channel, for example, on the surface in contact with the ion exchange membrane. In a case where a mesh material is included in the regeneration liquid channel, a mesh that is smaller in charge quantity than the mesh disposed on the electrode side of the regeneration liquid channel is used as the resistance increase element. In other words, multiple laminated mesh materials that differ in charge density are disposed in the regeneration channel, and the mesh disposed on the side closer to the eluent channel is relatively smaller in charge density than the mesh disposed on the side closer to the electrode.

Effects of the Invention

The ion suppressor according to the present invention is disposed for use between a separation column of an ion chromatograph and an electric conductivity meter. The element that acts as a resistance in the voltage application direction is disposed, thereby making it possible to suppress a local increase in current in a region where there is a large amount of ion to be exchanged (for example, on the upstream side of the eluent channel). Thus, the local generation of gases (oxygen and hydrogen) in the regeneration liquid is suppressed.

Since uneven dialysis due to bubbles present in the liquid is less likely to be caused, the baseline noise can be reduced. Moreover, the local generation of bubbles is suppressed, thereby making local degradation of the ion exchange membrane less likely to be caused. Thus, the life of the ion exchange membrane is expanded, and accordingly, the life of the ion suppressor can be extended.

DETAILED DESCRIPTION

Figure 1:
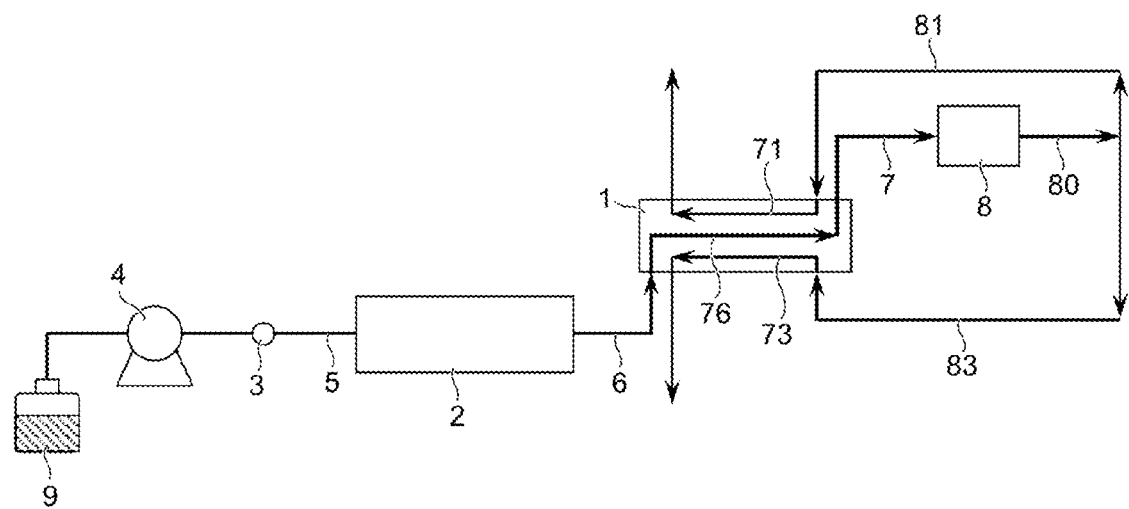
FIG. 1 is a schematic diagram illustrating a configuration example of suppressor-type ion chromatograph.

FIG. 1 is a schematic diagram illustrating a configuration example of suppressor-type ion chromatograph. A liquid feeding channel 5 provided with a liquid feeding pump 4 for supplying an eluent 9 is connected to a separation column 2. An injection unit 3 for injecting a sample to be analyzed is disposed in the middle of the liquid feeding channel 5. The sample injected into the separation column 2 is separated into respective ions in the separation column 2, and the eluent from the separation column 2 is guided to the eluent channel 76 of the ion suppressor 1 through a channel 6. The eluent which has an electric conductivity decreased due to the ion exchange in the ion suppressor 1 is guided from a channel 7 to an electric conductivity meter 8, and ions in the liquid are detected by the measurement of the electric conductivity. The eluent passing through the electric conductivity meter 8 is discharged to a channel 80. The channel 80 is divided into two channels, and the eluents from the channels 81 and 83 are, as regeneration liquids for regenerating the ion exchange membranes, introduced into the regeneration liquid channels 71 and 73 of the ion suppressor 1.

First Embodiment

Figure 2:
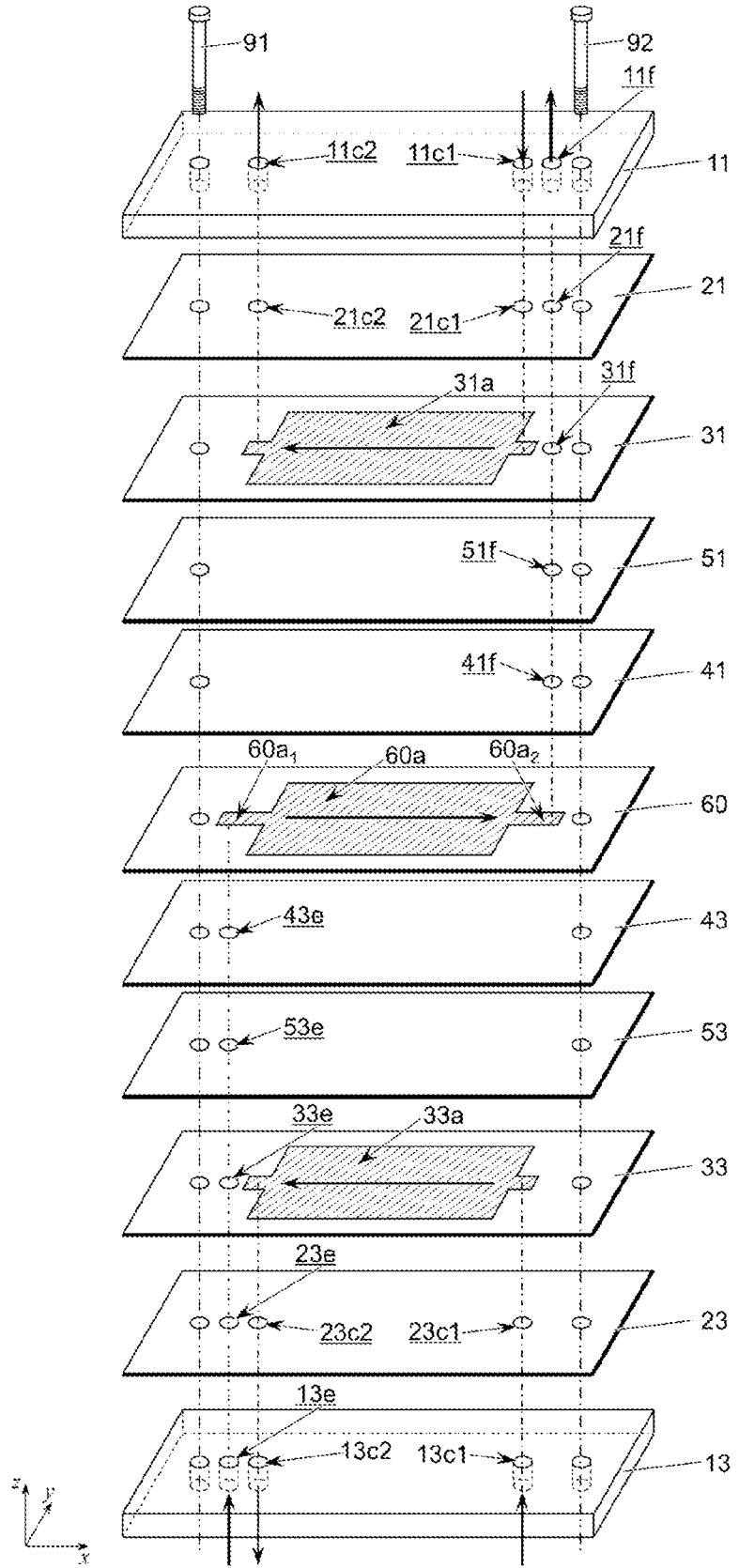
FIG. 2 is an exploded perspective view illustrating the configuration of an ion suppressor according to one embodiment.
Figure 3:
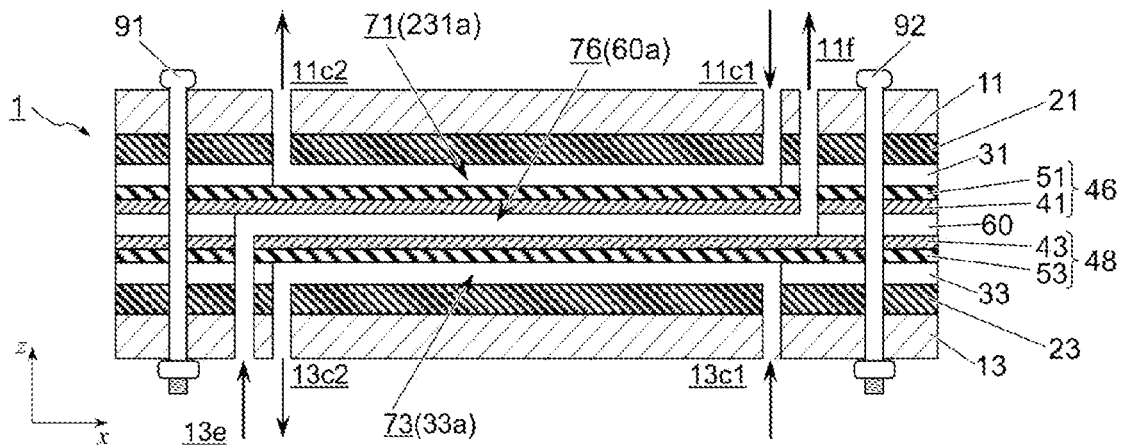
FIG. 3 is a cross-sectional view of an ion suppressor according to one embodiment.
Figure 10:
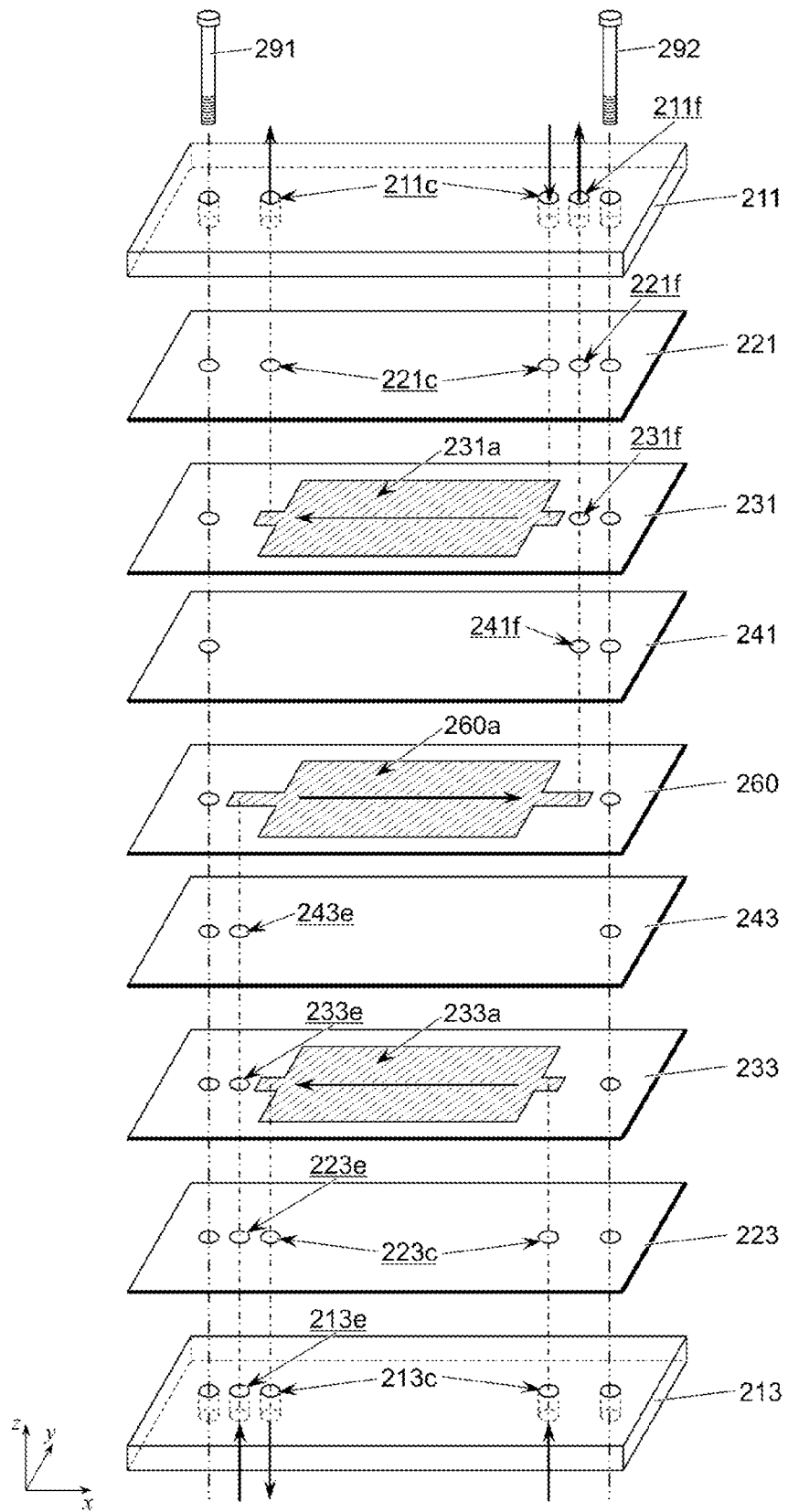
FIG. 10 is an exploded perspective view illustrating the configuration of an ion suppressor.

FIG. 2 is an exploded perspective view illustrating the configuration of an ion suppressor according to one embodiment, and FIG. 3 is a cross-sectional view of the ion suppressor assembled. This ion suppressor 1 has the same configuration as the ion suppressor 201 shown in FIGS. 10 and 11, except that the ion permeable membranes 51 and 53 are disposed respectively in contact with two ion exchange membranes 41 and 43.

The ion suppressor 1 includes the first ion exchange membrane 41 and the second ion exchange membrane 43 between an anode 21 and a cathode 23. A first ion permeable membrane 51 is disposed in contact with the first ion exchange membrane 41, and these membranes constitute a first ion exchanger 46. A second ion permeable membrane 53 is disposed in contact with the second ion exchange membrane 43, and these membranes constitute a second ion exchanger 48.

Between the first ion exchanger 46 and the second ion exchanger 48, an eluent channel support 60 is disposed. The eluent channel support 60 is provided with an opening 60a. The space formed by the wall surface of the opening 60a of the eluent channel support 60 and the ion exchangers 46 and 48 provided above and below the eluent channel support 60 forms an eluent channel 76. The thickness (the depth in the z direction) of the eluent channel 76 is, for example, approximately 50 to 300 µm.

Between the anode 21 and the first ion exchanger 46, a first regeneration liquid channel support 31 is disposed, and between the cathode 23 and the second ion exchanger 48, a second regeneration liquid channel support 33 is disposed. The first regeneration liquid channel support 31 is provided with an opening 31a, and the second regeneration liquid channel support 33 is provided with an opening 33a. The space formed by the wall surface of the opening 31a of the first regeneration liquid channel support 31 and the anode 21 and first ion exchanger 46 provided above and below the first regeneration liquid channel support 31 forms the first regeneration liquid channel 71. The space formed by the wall surface of the opening 33a of the second regeneration liquid channel support 33 and the cathode 23 and the second ion exchanger 48 provided above and below the second regeneration liquid channel support 33 forms the second regeneration liquid channel 73.

Figure 4:
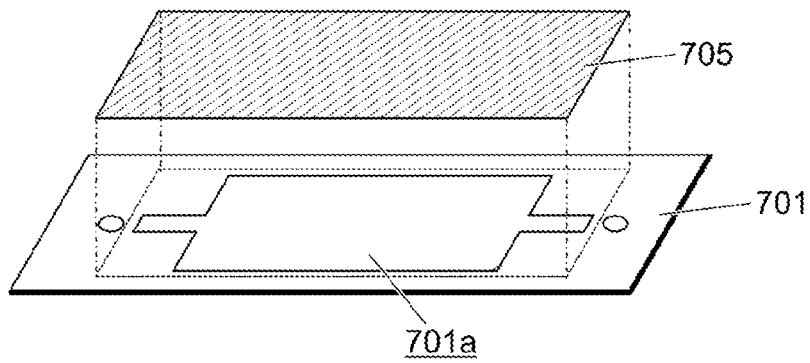
FIG. 4 is an exploded perspective view illustrating a configuration example of a channel support.
Figure 5:
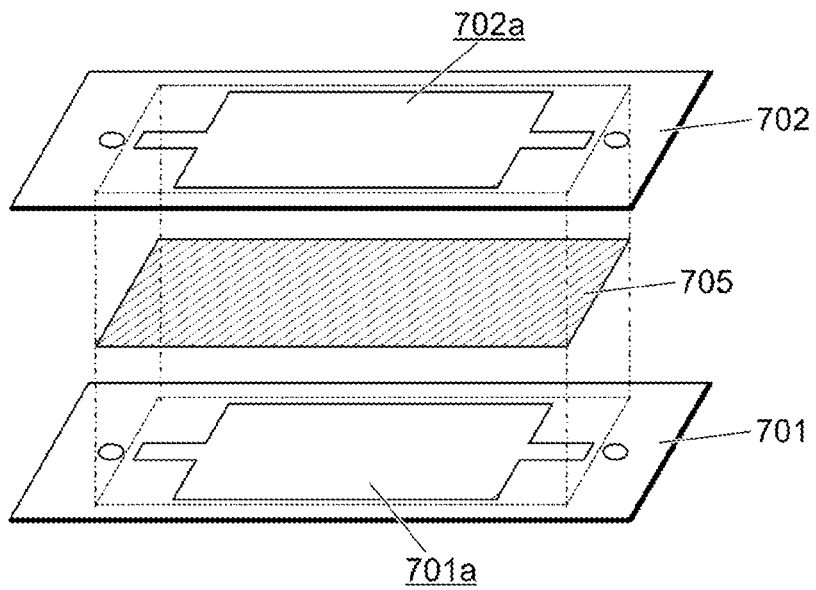
FIG. 5 is an exploded perspective view illustrating a configuration example of a channel support.
Figure 9:
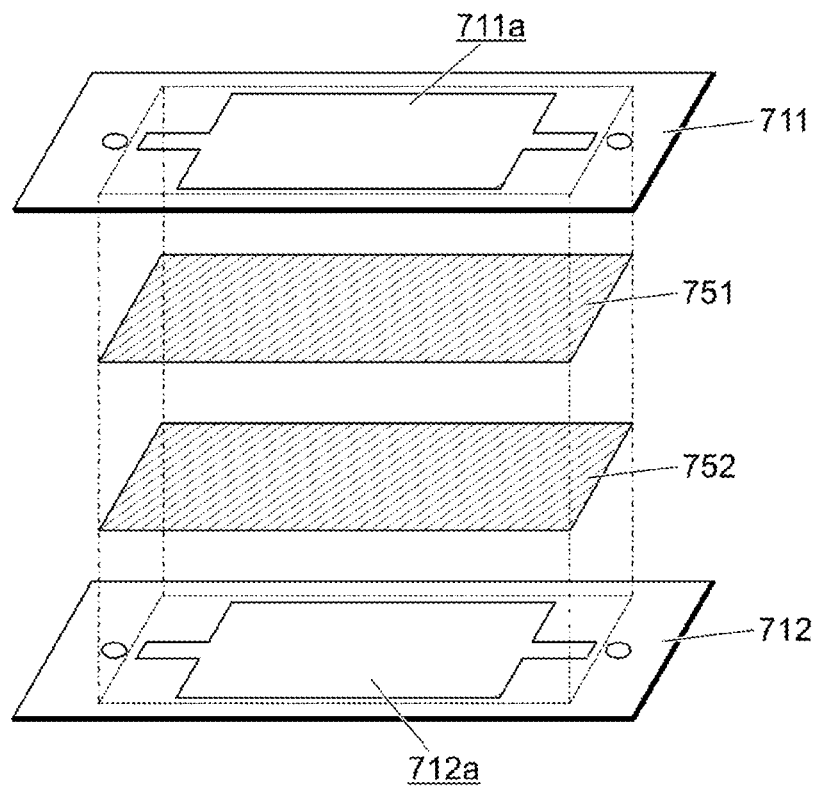
FIG. 9 is an exploded perspective view illustrating a configuration example of a regeneration liquid channel support.

The opening 60a which serves as a channel for the eluent and the openings 31a and 33a which serve as channels for the regeneration liquid have only to allow liquid to permeate the channels. These openings may be hollow, or may be provided with a mesh material such as a screen. As the mesh material, a material that has an ion exchange function is used. In the case of providing the opening with the mesh material, the mesh material may be joined to the wall surface of the opening, or a mesh material 705 may be bonded to the main surface of a substrate 701 by gluing or the like so as to cover an opening 701a of the substrate 701 as shown in FIG. 4. Alternatively, as shown in FIG. 5, the mesh material 705 may be sandwiched and fixed between two substrates 701 and 702. As shown in FIG. 9, two or more mesh materials may be laminated and used. The openings of the channel supports may be filled with beads made of an ion exchange resin or the like, instead of the mesh material.

In the ion suppressor 1, the anode 21, the first regeneration liquid channel support 31, the first ion exchanger 46, the eluent channel support 60, the second ion exchanger 48, the second regeneration liquid channel support 33, and the cathode 23 are sandwiched between an anode side holder 11 and a cathode side holder 13 and fixed by bolts 91, 92 and the like.

The holders 11 and 13 are formed from a material that is inactive against adsorption and elution of ions, and for the material, for example, a resin material is used, such as acrylic or polyetheretherketone (PEEK). The regeneration liquid channel supports 31 and 33 and the eluent channel support 60 are also formed from materials that are inactive against adsorption and elution of ions. These supports form channels, and serve as gaskets in close contact with an ion exchange membrane or an electrode disposed adjacently. Accordingly, the materials of the regeneration liquid channel supports 31 and 33 and the eluent channel support 60 preferably have liquid tightness, and for the materials, polyolefins such as polyethylene and polypropylene; rubber-based materials such as silicone rubbers; engineering plastics such as PEEK, and fluorine-based materials such as polytetrafluoroethylene (PTFE) are used, for example.

The anode 21 and the cathode 23 are formed from, for example, metal materials. As the metal for the anode 21, Ti, Pt, Ir or the like is suitably used. As the metal for the cathode 23, SUS or the like is suitably used. The materials for the anode 21 and the cathode 23 are not limited to the foregoing materials, and Au, Pd, Ru, Rh, Ag, and alloys thereof may be used. The thicknesses of the anode 21 and the cathode 23 may be any thickness that operates as an electrode, and are, for example, approximately 500 to 2000 µm. The holder 11 and the anode 21 may be formed integrally, and the holder 13 and the cathode 23 may be formed integrally.

The ion exchange membranes 41 and 43 may be cation exchange membranes or anion exchange membranes. In the case of measuring anions by ion chromatography, a cation exchange membrane is used. As the cation exchange membrane, a fluorine-based material is preferably used because of its excellent durability. Examples of the fluorine-based cation exchange resin include polymers in which perfluorocarbon has an acidic functional group such as a sulfo group or a carboxy group introduced therein, and commercially available cation exchange membranes may be used, such as Nafion. The thicknesses of the ion exchange membranes 41 and 43 are, for example, approximately 0.1 to 0.5 mm. In order to suppress the blockage of the channel due to the volume change, the thickness of the ion exchange membrane is preferably 0.3 mm or less.

The ion permeable membranes 51 and 53 provided in contact with the ion exchange membranes 41 and 43 are not particularly limited as long as ions that permeate the ion exchange membranes 41 and 43 are capable of permeating the ion permeable membranes 51 and 53. In a case where the ion exchange membranes 41 and 43 are cation exchange membranes, the ion permeable membranes 51 and 53 have only to allow cation permeation, and may have a property of selectively allowing permeation of specific ions (allowing permeation of both ions and anions). The ion permeable membranes 51 and 53 may be ion exchange membranes. The thicknesses of the ion permeable membranes 51 and 53 are, for example, approximately 0.1 to 0.5 mm.

The ion exchanger 46 where the first ion exchange membrane 41 and the first ion permeable membrane 51 are laminated is higher in resistance in the thickness direction (z direction) than the single membrane of the first ion exchange membrane 41. Similarly, the ion exchanger 48 where the second ion exchange membrane 43 and the second ion permeable membrane 53 are laminated is higher in resistance in the thickness direction than the single membrane of the second ion exchange membrane 43. In order to increase the resistance of the ion exchangers 46 and 48 in the thickness direction, the ion permeable membranes 51 and 53 may have a higher resistivity than the ion exchange membranes 41 and 43.

The eluent from the separation column 2 is introduced from the eluent introduction hole 13e provided in the holder 13, into the ion suppressor 1 through the channel 6. The eluent passes through an eluent passage hole 23e provided in the cathode 23, an eluent passage hole 33e provided in the regeneration liquid channel support 33, an eluent passage hole 53e provided in the ion permeable membrane 53, and an eluent passage hole 43e provided in the ion exchange membrane 43, and the eluent is then guided into the eluent channel 76 from an introduction channel 60a1 provided at one end of the opening 60a of the eluent channel support 60. The eluent undergoes ion exchange while moving through the eluent channel 76, and the eluent is discharged from a discharge channel 60a2 provided at the other end of the opening 60a. The eluent discharged from the eluent channel 76 passes through an eluent passage hole 41f provided in the ion exchange membrane 41, an eluent passage hole 51f provided in the ion permeable membrane 51, an eluent passage hole 31f provided in the regeneration liquid channel support 31, and an eluent passage hole 21f provided in the anode 21, and the eluent is then discharged to the outside of the ion suppressor 1 from an eluent discharge hole 11f provided in the holder 11, and guided from the channel 7 to an electric conductivity meter 8 to measure the electric conductivity of the eluent.

FIGS. 2 and 3 show an embodiment in which the eluent introduced from the side close to the cathode 23 is discharged to the side close to the anode 21, but the eluent may be introduced from the anode side, and then discharged to the cathode side. Furthermore, the eluent may be both introduced and discharged from either the anode side or the cathode side.

The regeneration liquid is introduced from the regeneration liquid introduction hole 11c1 of the holder 211 and the regeneration liquid introduction hole 13c1 of the holder 213. The regeneration liquid introduced from the regeneration liquid introduction hole 11c1 passes through a regeneration liquid passage hole 21c1 provided in the anode 21, and the regeneration liquid is then introduced into the first regeneration liquid channel 71 from an introduction channel 31a1 provided at one end of the opening 31a of the first regeneration liquid channel support 31. The regeneration liquid is discharged from a discharge channel 31a2 provided at the other end of the opening 31a to the outside of the channel, and through a regeneration liquid passage hole 21c2, the regeneration liquid is discharged from a regeneration liquid discharge hole 11c2. The regeneration liquid introduced from the regeneration liquid introduction hole 13c1 of the holder 13 is guided to the second regeneration liquid channel 73, and then discharged from the regeneration liquid discharge hole 13c2. In the case of using the eluent passing through the electric conductivity meter 8 as the regeneration liquid, the regeneration liquid (the eluent after electric conductivity measurement) is introduced from the regeneration liquid channels 71 and 73 into the regeneration liquid introduction holes 11c1 and 13c1 of the ion suppressor 1 as shown in FIG. 1.

With a voltage applied between the anode 21 and the cathode 23, ion suppression is performed by allowing the eluent to flow through the eluent channel 76, and allowing the regeneration liquid to flow through the regeneration liquid channels 71 and 73 located above and below the eluent. In the first regeneration liquid channel 71 between the anode 21 and the first ion exchange membrane 41, $H^+$ and $O_2$ are produced by electrolysis of water. In the regeneration liquid channel 73 between the cathode 23 and the second ion exchange membrane 43, $OH^-$ and $H_2$ are produced by electrolysis of water. In a case where the first ion exchange membrane 41 and the second ion exchange membrane 43 are cation exchange membranes, the $H^+$ produced in the first regeneration liquid channel 71 permeates the first ion exchange membrane 41, and then moves into the eluent channel 76.

The $H^+$ moving from the first regeneration liquid channel 71 to the eluent channel 76 is substituted with cations such as sodium ions or potassium ions in the eluent. The $H^+$ moving to the eluent channel 76 is also substituted with the counter ion of the anion to be measured. The cations substituted with $H^+$ permeate the second ion exchange membrane 43, and then move into the second regeneration liquid channel 73.

The first ion permeable membrane 51 allows cation permeation, and thus does not prevent the movement of $H^+$ from the first regeneration liquid channel 71 to the eluent channel 76. The second ion permeable membrane 53 allows cation permeation, and thus does not prevent the movement of cations from the eluent channel 76 to the second regeneration liquid channel 73. Accordingly, even in a case where the ion permeable membranes 51 and 53 are disposed in contact with the ion exchange membranes 41 and 43, ion exchange is performed by electrodialysis as in the case of the ion suppressor 201 shown in FIGS. 10 and 11, and the detection accuracy in ion chromatography is improved with the background decreased due to the decreased electric conductivity of the eluent and the sensitivity improved by exchange of the counter ion of the ion to be measured. Furthermore, since ions move between the regeneration liquid channels 71 and 73 and the eluent channel 76, the ion exchange membranes 41 and 43 are electrochemically regenerated.

As described previously, the ion exchangers 46 and 48 where the ion permeable membranes 51 and 53 are disposed in contact with the ion exchange membranes 41 and 43 are higher in resistance in the thickness direction as compared with the single ion exchange membrane. The voltages applied to the regeneration liquid channels 71 and 73 and the eluent channel 76 are reduced due to the resistance of the ion permeable membranes 51 and 53.

Figure 11:
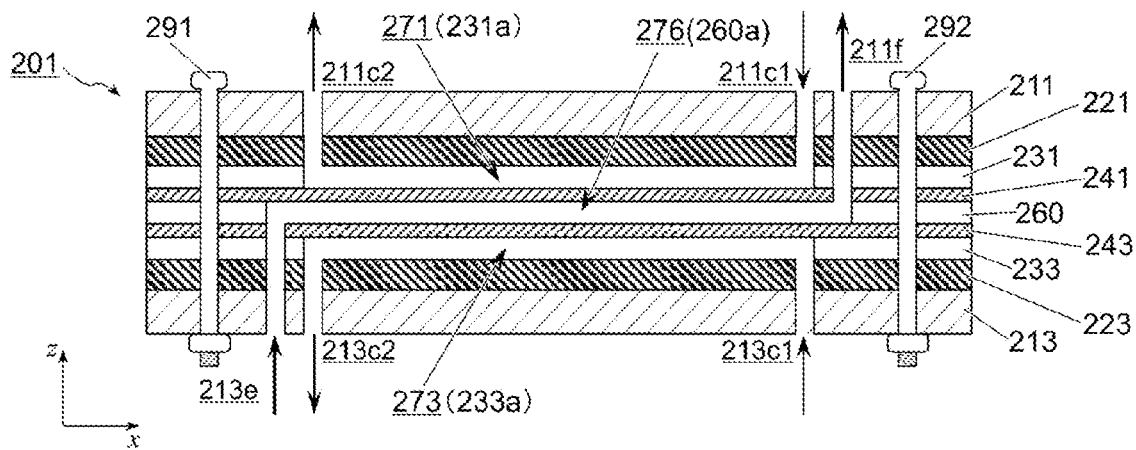
FIG. 11 is a cross-sectional view of the ion suppressor.

As shown in FIG. 11, in a case where only the ion exchange membranes 241 and 243 are disposed between the regeneration liquid channels 271 and 273 and the eluent channel 276, the resistance is relatively low, and the amount of current is large. In particular, on the upstream side of the eluent channel 276, the current tends to be larger than that on the downstream side, because the high concentration of the cation to be exchanged, contained in the eluent. At sites with large amounts of current, the cation movement is increased, thus increasing the amount of oxygen produced in the first regeneration liquid channel 271 and the amount of hydrogen produced in the second regeneration liquid channel 273.

Since oxygen and hydrogen have low solubility in water, the oxygen and hydrogen produced in the regeneration liquid remain as bubbles in the flow path. In some cases, the bubbles remaining in the channel may adhere to the ion exchange membranes 241 and 243. No ions move in the bubble, thus preventing the movement of H' from the first regeneration liquid channel 271 to the eluent channel 276 and the movement of cations (sodium ions, potassium ions, and the like) from the eluent channel 276 to the second regeneration liquid channel 273 at sites with bubble present. At a location with a large amount of current, a large number of bubbles remain, thus resulting in locally insufficient ion exchange in the eluent, and a local background rise appears as noise on the baseline.

In addition, the oxygen produced in the regeneration liquid channel can cause the ion exchange membrane to be degraded. In the case of a large amount of current on the upstream of the eluent channel 276, the amount of oxygen produced in the vicinity is locally large, thus making the ion exchange membrane likely to be degraded, and then decreasing the membrane life.

In the ion suppressor 1 according to an embodiment of the present invention, the ion permeable membranes 51 and 53 are disposed in contact with the ion exchange membranes 41 and 43 to increase the resistance between the regeneration liquid channels 71 and 73 and the eluent channel 76 in the thickness direction (voltage application direction), thereby suppressing a local increase in current. Thus, over the entire length of the channel, the ion exchange amount is uniform, thereby suppressing local gas generation on the upstream side of the eluent channel. Accordingly, the suppression of local gas generation suppresses noise generation on the baseline due to the local gas generation and degradation of the ion exchange membrane due to oxygen.

The thicknesses of the ion exchange membranes 241 and 243 may be increased for simply increasing the resistance in the thickness direction between the regeneration liquid channels and the eluent channel. Fluorine-based ion exchange membranes such as Nafion, however, are high in the ratio of swelling due to water. For example, the swelling rate of Nafion with respect to water is approximately 10 to 15%. When the ion exchange membrane which is large in thickness is swollen, the swollen membrane causes the channel to be blocked. If the channel is blocked due to swelling of the ion exchange membrane, the flows of the eluent and the regeneration liquid may become non-uniform, thereby causing the base line to be disturbed or causing problems such as liquid leakage due to the increased pressure in the channel. Even in a case where only an ion exchange membrane is used which is higher in resistivity than a fluorine-based ion exchange membrane, the resistance in the thickness direction is increased, but the non-fluorine material has low durability, and it is difficult to extend the life of the membrane.

On the other hand, if the ion permeable membranes 51 and 53 made of another material are disposed in contact with the fluorine-based ion exchange membranes 41 and 43, the membrane is less likely to be swollen, and the resistance in the thickness direction can be increased. The fluorine-based ion exchange membranes 41 and 43 and the ion permeable membranes 51 and 53 made of another material are laminated, thereby, allowing noise generation on the line to be suppressed with an increase in resistance, while maintaining the length of the life, which is an advantage of the fluorine-based ion exchange membranes.

As described previously, the materials of the ion permeable membranes 51 and 53 are not particularly limited as long as the membranes are capable of ion permeation. From the viewpoint of preventing blockage of the channel due to swelling, the ion permeable membranes 51 and 53 are preferably higher in swelling ratio with respect to water than the ion exchange membranes 41 and 43. The swelling ratio of the ion permeable membranes 51 and 53 with respect to water is preferably 5% or less, more preferably 3% or less.

The ion permeable membranes 51 and 53 are preferably higher in resistivity than the ion exchange membranes 41 and 43. On the other hand, when the resistivity of the ion permeable membranes is excessively high, the current efficiency is decreased, and defects due to heat generation may be caused. The resistivity of the ion permeable membranes 51 and 53 is preferably approximately 1.1 to 20 times, more preferably approximately 1.3 to 15 times, even more preferably 1.5 to 10 times as high as the resistivity of the ion exchange membranes 41 and 43 disposed in contact with the ion permeable membranes.

It is preferable to use an ion-exchangeable material as the ion permeable membranes 51 and 53, because of their appropriate resistivity and high ion permeability. The use of an ion-exchangeable material (ion exchange membranes) as the ion permeable membranes leads to an extended ion suppressor life, because even if one of the ion exchange membrane and ion permeable membrane constituting the ion exchanger is degraded under the influence of oxygen or the like, the other thereof maintains the function as an ion exchange membrane. In the case of using ion exchange membranes as the ion permeable membranes 51 and 53, a hydrocarbon-based material or the like is preferred as a material for the membranes.

In the ion suppressor 1 shown in FIGS. 2 and 3, the ion exchange membranes 41 and 43 of the ion exchangers 46 and 48 are provided in contact with the eluent channel 76, and the ion permeable membranes 51 and 53 thereof are provided in contact with the regeneration liquid channels 71 and 73. As in the ion suppressor 101 shown in FIG. 6, ion permeable membranes 51 and 53 may be disposed to make contact with an eluent channel 76, and ion exchange membranes 41 and 43 may be disposed to make contact with regeneration liquid channels 71 and 73. The ion exchanger may be provided with two or more ion exchange membranes or two or more ion permeable membranes. For example, an ion permeable membrane (for example, a hydrocarbon-based ion exchange membrane) may be disposed in contact with both surfaces of a fluorine-based ion exchange membrane such as Nafion.

Figure 6:
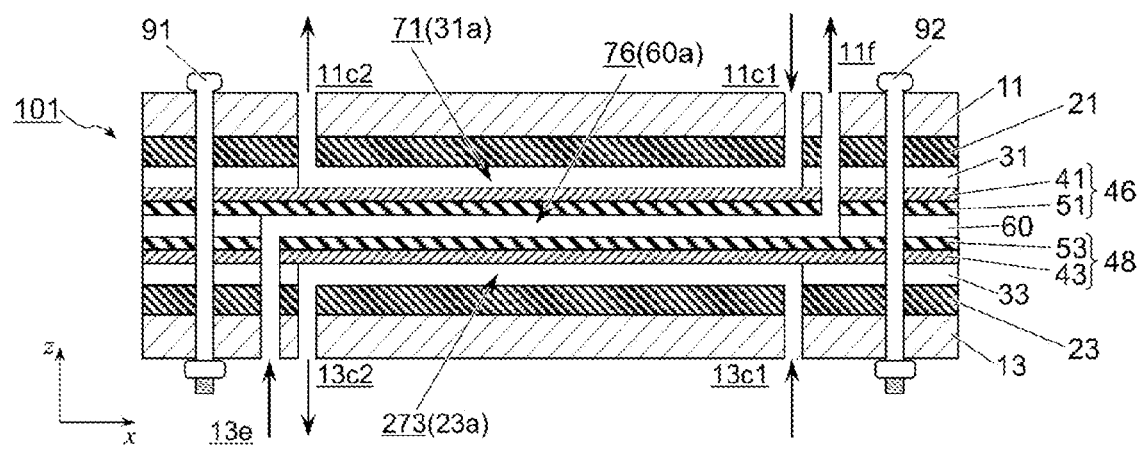
FIG. 6 is a cross-sectional view of an ion suppressor according to one embodiment.
Figure 12:
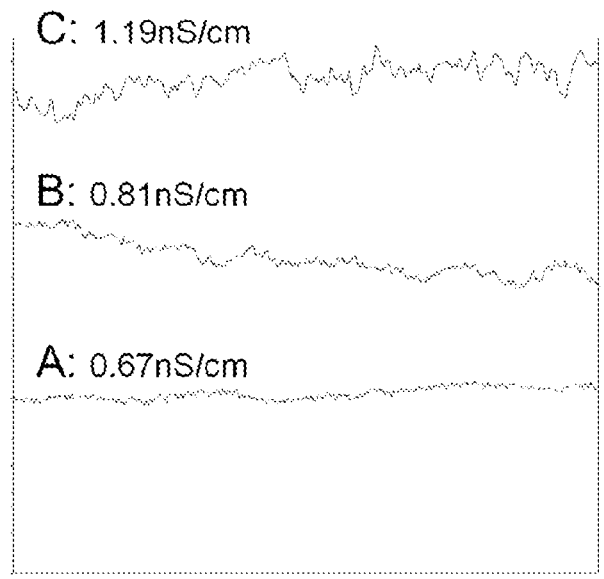
FIG. 12 is the result of baseline measurement for ion chromatography.

FIG. 12 shows the result of measuring the baseline of anion chromatography, with changes in the laminated configuration of the ion exchange membrane disposed between the regeneration liquid channel and eluent channel of the ion suppressor. C represents, as shown in FIG. 11, a baseline in the case of using only Nafion membranes as ion exchange membranes disposed above and below the eluent channel, and in conformity with the ASTM standard, the noise calculated for 30 points at an interval of 0.5 minutes was 1.19 nS/cm. A represents, as shown in FIG. 6, a baseline in the case of disposing a Nafion membrane on the regeneration liquid channel side and a hydrocarbon-based ion exchange membrane on the eluent channel side, and the noise was 0.67 nS/cm. B represents, as shown in FIG. 3, a baseline in the case of disposing a hydrocarbon-based ion exchange membrane on the regeneration liquid channel side and a Nafion membrane on the eluent channel side, and the noise was 0.81 nS/cm. From the results of measuring the baseline in FIG. 12, it is determined that the baseline noise is reduced by disposing a hydrocarbon-based ion exchange membrane as an ion permeable membrane in contact with the fluorine-based ion exchange membrane.

From the viewpoint of increasing the resistance in the voltage application direction (z direction), it is not always necessary to dispose ion permeable membranes on both surfaces of the eluent channel 76. For example, as long as the ion permeable membrane 51 is provided in contact with the first ion exchange membrane 41 on the anode side, no ion permeable membrane may be provided on the second ion exchange membrane 43 on the cathode side.

Figure 7:
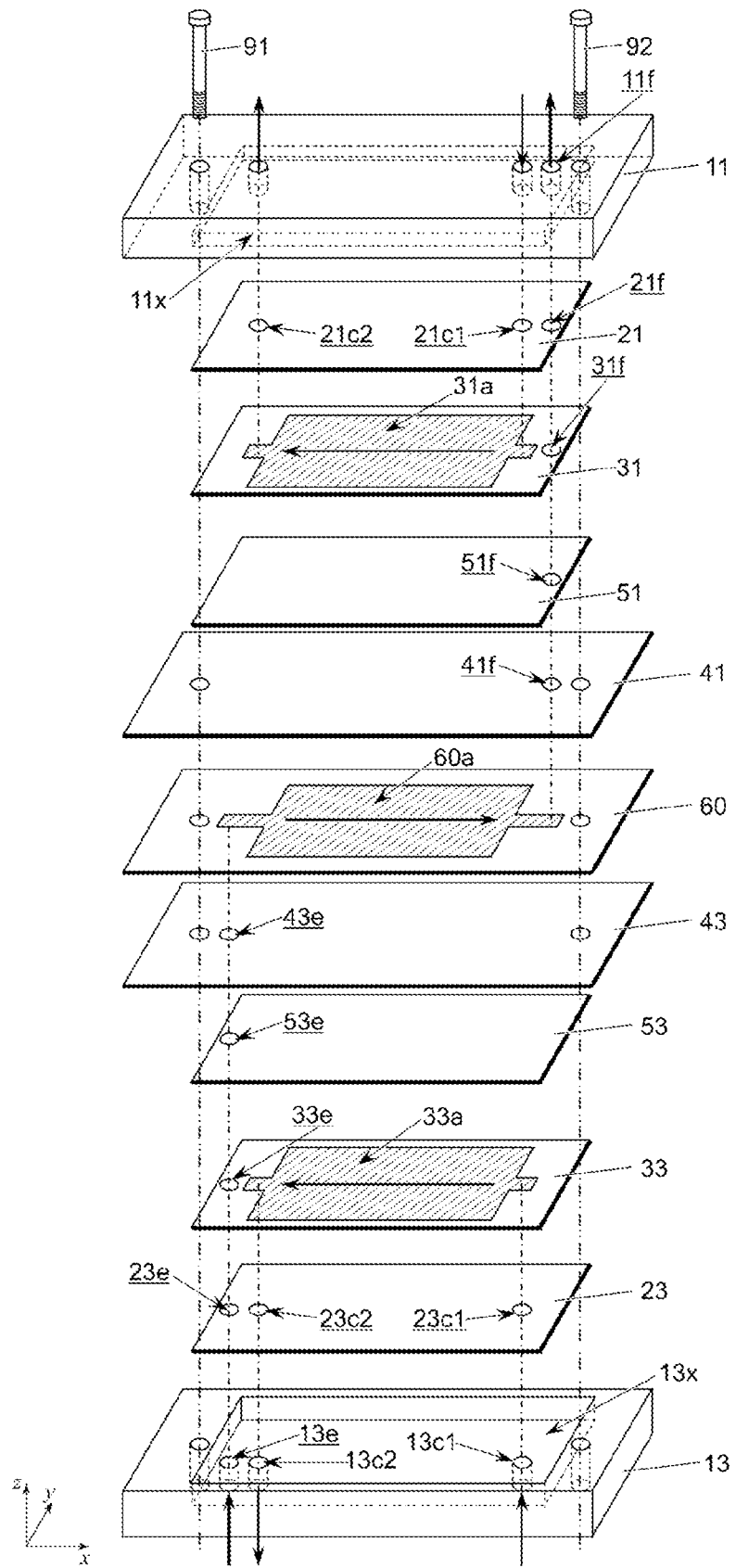
FIG. 7 is an exploded perspective view illustrating the configuration of an ion suppressor according to one embodiment.

For the ion exchanger where the ion exchange membrane and the ion permeable membrane are laminated, the ion exchange membrane and the ion permeable membrane may have different size (area) and shape. For example, as shown in the exploded perspective view of FIG. 7, the areas of the ion permeable membranes 51 and 53 may be smaller than the areas of the ion exchange membranes 41 and 43, and the ion exchange membranes 41 and 43 may be provided to cover the entire ion permeable membranes 51 and 53.

Figure 8:
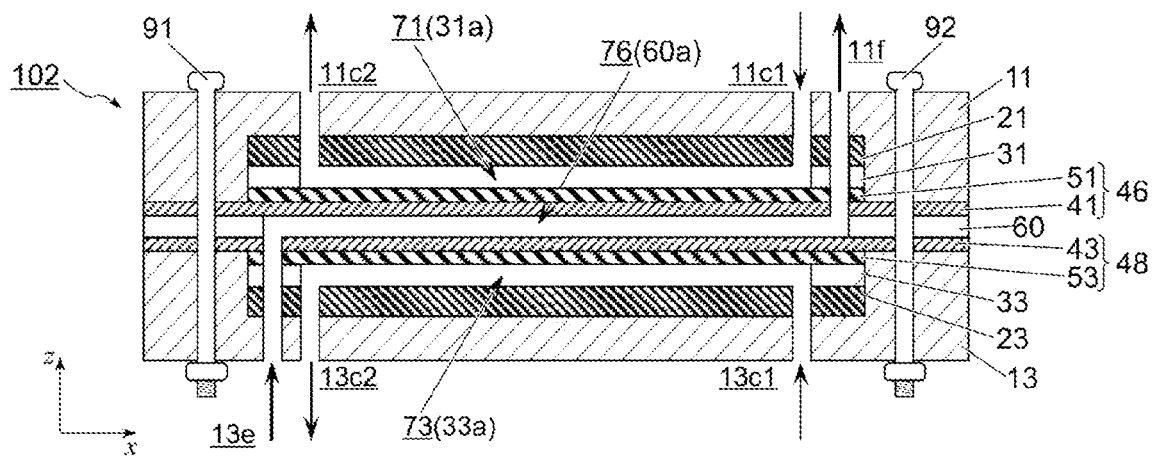
FIG. 8 is a cross-sectional view of an ion suppressor according to one embodiment.

FIG. 8 is a cross-sectional view of an ion suppressor assembled. In this ion suppressor 102, the area of a first ion permeable membrane 51 is smaller than that of a first ion exchange membrane 41, and the area of a second ion permeable membrane 53 is smaller than that of a second ion exchange membrane 43. As with the ion permeable membranes 51 and 53, an anode 21, a first regeneration liquid channel support 31, a second regeneration liquid channel support 33, and a cathode 23 are also smaller in area than the ion exchange membranes 41 and 43.

The ion exchange membranes 41 and 43 which are relatively large in area and the eluent channel support 60 disposed therebetween are provided with through holes for bolts 91 and 92. The ion permeable membranes 51, 53 which are relatively small in area, the regeneration liquid channel supports 31 and 33, the anode 21 and the cathode 23 are disposed on the inner sides of the bolt penetration sites. The upper and lower holders 11 and 13 are provided with recesses 11x and 13x corresponding to the sites where the ion permeable membranes 51 and 53, the regeneration liquid channel supports 31 and 33, the anode 21, and the cathode 23 are disposed. The depth of the recess 11x of the holder 11 is adjusted such that the recess 11x is capable of housing the anode 21, the first regeneration liquid channel support 31 and the first ion permeable membrane 51. In a case where the depth of the recess 11x is slightly smaller than the total thickness of the anode 21, the first regeneration liquid channel support 31, and the first ion permeable membrane 51, when the upper and lower holders 11 and 13 are fixed by bolts 91 and 92, the tightening force of the bolts can increase the adhesion between the respective members, thereby preventing liquid leakages. For the same reason, the recess 13x of the holder 13 is preferably slightly smaller than the total thickness of the cathode 23, the second regeneration liquid channel support 33, and the second ion permeable membrane 53.

Since the first ion exchange membrane 41 is disposed so as to cover the entire surface of the first ion permeable membrane 51, the first ion exchange membrane 41 is provided so as to seal the anode 21, first regeneration liquid channel support 31, and first ion permeable membrane 51 housed in the recess 11x of the holder 11 in the assembled ion suppressor 102. Since the second ion exchange membrane 43 is disposed so as to cover the entire surface of the second ion permeable membrane 53, the second ion exchange membrane 43 is provided so as to seal the cathode 23, second regeneration liquid channel support 33, and second ion permeable membrane 53 housed in the recess 13x of the holder 13 in the assembled ion suppressor 102.

In this way, the constituent members which are relatively small in area are sealed between the ion exchange membranes 41 and 43 and the holders 11 and 13, thereby allowing liquid leakages during the use of the ion suppressor to be reliably prevented. In a case where fluorine-based ion exchange membranes are used as the ion exchange membranes 41 and 43, the ion exchange membranes 41 and 43 are swollen when a liquid is allowed to flow through the channels 71, 73, and 76, thus further improving the sealing performance.

Second Embodiment

As mentioned above, according to the first embodiment, the ion permeable membranes 51 and 53 are disposed in addition to the ion exchange membranes 41 and 43 between the eluent channel 76 and the regeneration liquid channels 71 and 73, thereby increasing the resistance in the voltage application direction (z direction). According to the second embodiment of the present invention, the resistance in the voltage application direction is adjusted by increasing the resistance of regions of regeneration liquid channels 71 and 73 facing the eluent channel. For example, the resistance between the regeneration liquid channels 71 and 73 and the eluent channel may be increased by imparting a charge quantity distribution in the thickness direction to the mesh material provided in openings 31a and 33a of regeneration liquid channel supports 31 and 33.

FIG. 9 is an exploded perspective view of a regeneration liquid channel support for use in the ion suppressor according to the second embodiment. This channel support includes two screens 751 and 752 between an upper substrate 711 provided with an opening 711a and a lower substrate 712 provided with an opening 712a. In the assembled ion suppressor, the upper substrate 711 is provided in contact with an anode 21 and the lower substrate 712 is provided in contact with an ion exchange membrane 41 (or an ion exchanger 46).

The first screen 751 disposed closer to the anode 21 has a larger charge quantity (charge density) than the second screen 752 disposed closer to the ion exchange membrane 41. When the charge quantity of the second screen disposed at a position away from the electrode (position close to the eluent channel 76) is made relatively small, the resistance is increased against the ion conduction between the regeneration liquid channel 71 and the eluent channel 76. More specifically, the second screen 752 acts as a resistance increase element that increases the resistance in the voltage application direction. Thus, as in the case of providing the ion permeable membrane 51 in contact with the ion exchange membrane 41, the resistance in the voltage application direction is increased, thereby making it possible to suppress the local generation of bubbles on the upstream side of the eluent channel 76, and suppress noise generation and local membrane degradation due to oxygen.

The mesh material of the second regeneration liquid channel 73 closer to a cathode 23 may have a two-layer configuration. In this case, the charge quantity of the mesh material disposed close to an ion exchange membrane 43 may be made smaller than the charge quantity of the mesh material disposed close to the cathode 23.

The screen for the first regeneration liquid channel 71 and the screen for the second regeneration liquid channel 73 may both have a multilayer configuration. Three or more screens laminated may be disposed in the regeneration liquid channel. In the case of using three or more screens, the screens may be laminated such that the charge quantity of the screen decreases from the electrode side toward the eluent channel side.

The first embodiment and second embodiment of the present invention may be combined. More specifically, ion permeable membranes may be provided in contact with the ion exchange membranes, and multiple mesh materials that differ in charge quantity may be disposed in the regeneration liquid channels to increase the resistance of the ion suppressor in the voltage application direction.

DESCRIPTION OF REFERENCE SIGNS 2 separation column
3 injection part
8 electric conductivity meter
1, 101, 102 ion suppressor
11, 13 holder
21 electrode (anode)
23 electrode (cathode)
31, 33 regeneration liquid channel support
71, 73 regeneration liquid channel
41, 43 ion exchange membrane
51, 53 ion permeable membrane
46, 48 ion exchanger
60 eluent channel support
76 eluent channel

The invention claimed is:

1. An ion suppressor that exchanges ions in an eluent from a separation column of an ion chromatograph, the ion suppressor comprising:
 a first ion exchange membrane and a second ion exchange membrane are disposed between a pair of electrodes of a first electrode and a second electrode,
 an eluent channel for allowing passage of the eluent from the separation column of the ion chromatograph is provided in a space between the first ion exchange membrane and the second ion exchange membrane,
 a first regeneration liquid channel for allowing passage of a regeneration liquid that regenerates the first ion exchange membrane is provided in a space between the first electrode and the first ion exchange membrane,
 a second regeneration liquid channel for allowing passage of a regeneration liquid that regenerates the second ion exchange membrane is provided in a space between the second electrode and the second ion exchange membrane, and
 a resistance increase element that increases a resistance in a voltage application direction is disposed between the first regeneration liquid channel and the eluent channel and/or between the second regeneration liquid channel and the eluent channel;
 wherein
 an ion permeable membrane is disposed as the resistance increase element, and
 the ion permeable membrane is higher in resistivity than the first ion exchange membrane and/or the second ion exchange membrane.

2. The ion suppressor according to claim 1, wherein the ion permeable membrane is in contact with at least one of the first ion exchange membrane and the second ion exchange membrane, and
 the ion permeable membrane allows permeation of ions that permeate the first ion exchange membrane and the second ion exchange membrane.

3. The ion suppressor according to claim 2, wherein the ion permeable membrane is higher in resistivity than the ion exchange membrane disposed in contact with the ion permeable membrane.

4. The ion suppressor according to claim 2, wherein the ion permeable membrane is lower in swelling ratio with respect to water than the ion exchange membrane disposed in contact with the ion permeable membrane.

5. The ion suppressor according to claim 2, wherein the ion permeable membrane is smaller in area than the ion exchange membrane disposed in contact with the ion permeable membrane.

6. The ion suppressor according to claim 2, wherein the ion permeable membrane is disposed in contact with the eluent channel.

7. The ion suppressor according to claim 2, wherein the ion permeable membrane is disposed in contact with the first regeneration liquid channel or the second regeneration liquid channel.

8. The ion suppressor according to claim 2, wherein the first ion exchange membrane and the second ion exchange membrane are cation exchange membranes.

9. The ion suppressor according to claim 8, wherein the cation exchange membrane comprises a fluorine-based material.

10. The ion suppressor according to claim 9, wherein the ion permeable membrane is a hydrocarbon-based ion exchange membrane.

11. The ion suppressor according to claim 2, wherein the resistance increase element is disposed in at least one of a region of the first regeneration liquid channel facing the eluent channel and a region of the second regeneration liquid channel facing the eluent channel.

12. The ion suppressor according to claim 11, wherein the regeneration liquid channel with the resistance increase element disposed is lower in charge density on a side close to the eluent channel than on a side close to the electrode.

13. The ion suppressor according to claim 12, wherein two or more laminated mesh materials that differ in charge quantity are disposed in the regeneration liquid channel with the resistance increase element disposed, and
 a mesh material disposed on a side close to the eluent channel is lower in charge density than a mesh material disposed on a side close to the electrode.

14. A chromatograph comprising:
 a separation column that separates an ion to be measured;
 an electric conductivity meter that measures an electric conductivity of an eluent from the separation column; and the ion suppressor according to claim 1 in a channel between the separation column and the electric conductivity meter.

15. An ion suppressor that exchanges ions in an eluent from a separation column of an ion chromatograph, the ion suppressor comprising:
- a first ion exchange membrane and a second ion exchange membrane are disposed between a pair of electrodes of a first electrode and a second electrode,
- an eluent channel for allowing passage of the eluent from the separation column of the ion chromatograph is provided in a space between the first ion exchange membrane and the second ion exchange membrane,
- a first regeneration liquid channel for allowing passage of a regeneration liquid that regenerates the first ion exchange membrane is provided in a space between the first electrode and the first ion exchange membrane,
- a second regeneration liquid channel for allowing passage of a regeneration liquid that regenerates the second ion exchange membrane is provided in a space between the second electrode and the second ion exchange membrane, and
- a resistance increase element that increases a resistance in a voltage application direction is disposed between the first regeneration liquid channel and the eluent channel and/or between the second regeneration liquid channel and the eluent channel, wherein
an ion permeable membrane is disposed as the resistance increase element, and
the ion permeable membrane is lower in swelling ratio with respect to water than the first ion exchange membrane and/or the second ion exchange membrane.

16. An ion suppressor that exchanges ions in an eluent from a separation column of an ion chromatograph, the ion suppressor comprising:
- a first ion exchange membrane and a second ion exchange membrane are disposed between a pair of electrodes of a first electrode and a second electrode,
- an eluent channel for allowing passage of the eluent from the separation column of the ion chromatograph is provided in a space between the first ion exchange membrane and the second ion exchange membrane,
- a first regeneration liquid channel for allowing passage of a regeneration liquid that regenerates the first ion exchange membrane is provided in a space between the first electrode and the first ion exchange membrane,
- a second regeneration liquid channel for allowing passage of a regeneration liquid that regenerates the second ion exchange membrane is provided in a space between the second electrode and the second ion exchange membrane, and
- a resistance increase element that increases a resistance in a voltage application direction is disposed between the first regeneration liquid channel and the eluent channel and/or between the second regeneration liquid channel and the eluent channel, wherein
an ion permeable membrane is disposed as the resistance increase element, and
the regeneration liquid channel with the resistance increase element disposed is lower in charge density on a side close to the eluent channel than on a side close to the electrode.

* * * * *